Patented Oct. 17, 1933

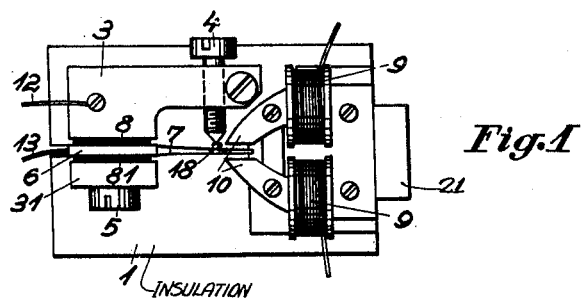

1,931,267

UNITED STATES PATENT OFFICE 1,931,267

MECHANICAL RECTIFIER

Hans Pfannenmuller, Berlin-Siemensstadt, Germany, assignor to Siemens & Halske Aktiengesellschaft, Siemensstadt, near Berlin, Germany, a corporation of Germany Application February 24, 1930, Serial No. 430,691, and in Germany May 28, 1929

15 Claims. (Cl. 200—166)

My invention relates to improvements in mechanical rectifiers.

In making measurements with the aid of alternating currents, and particularly with measuring instruments or relays of great accuracy, it has been found desirable to employ mechanical rectifiers to increase the sensitiveness of an alternating current measurement since it is then possible to use a considerably more sensitive direct current measuring instrument instead of the less sensitive alternating current instrument. On account of the similarity of construction the designation "mechanical rectifier" is in the industry also applied to apparatus which does not convert alternating current into direct current, but generally opens or closes measuring or control circuits synchronously with the measuring or control current and likewise operates in conjunction with direct current apparatus, for instance connections for measuring the momentary value of an alternating current or for determining the components of a vector and so on. My invention is applicable to all such apparatus for synchronously opening and closing measuring circuits.

Since a direct current measuring instrument measures the mean value of a current between the switching-in and switching-out time, it is absolutely necessary that the phase position in which the mechanical rectifier changes over should be permanently fixed and also that the closure of the contacts take place in a mechanically perfect manner without any rebound. None of the mechanical rectifiers used hitherto meets all of these requirements. A particularly objectionable feature of existing devices is the variation in the timing of the switching-in and switching-out, which variation is a result of the unavoidable temperature fluctuations. Changes in temperature will bend or distort parts of the rectifier and alter the distance between the position of rest of the oscillating contact and the stationary contact co-operating therewith. In order to avoid inaccuracies due to rebound, the switching path of the movable contact is made so short that even microscopically minute changes in this switching path cause an objectionable change in the timing of the vibrating contact or interrupter mechanism of these devices as constructed hitherto.

Researches extending over a long time have shown that the disturbing influence of temperature changes is due, in devices as constructed hitherto, to unsuitable arrangements of the joints or breaks of continuity in the materials which are interposed between the stationary and the oscillating contacts for the purpose of insulation, for conducting the magnetic fluxes and for manufacturing reasons. By breaks in the continuity I mean the places where two materials of different physical properties come in contact, more particularly materials of different temperature coefficients and different elasticity constants.

In the event of temperature fluctuations deformations will generally occur at such breaks of continuity and will prevent a uniform expansion or contraction of the members which are in contact with each other at such joints or breaks of continuity. It has been ascertained that in mechanical rectifiers such deformations of the joints are liable to cause displacements at other points of the system, and more particularly at the oscillating contacts, which displacements amount to a multiple of the maximum linear heat expansion of the system.

According to my invention these effects are prevented by a symmetrical design of the places where the flux passes from one part to the other, by a symmetrical repetition of the breaks in continuity or joints. Not every symmetry is effective, neither is perfect symmetry necessary, and symmetry is sufficient in a plane which stands at right angles to the plane extending through the place of contact and the center of the respective place of passage of the flux. The symmetry extends to the dimensions and the physical properties (heat expansion, elasticity) of the materials. Equal heat conducting capacity is not absolutely necessary.

A further improvement is attained if also the permanent magnetic flux is simultaneously made to act symmetrically on the oscillating member so that in the state of the rest the forces neutralize one another. It is particularly easy to arrange a tongue-shaped oscillating member symmetrically as regards heat conduction as well as distribution of forces.

In the drawing affixed to my specification two embodiments of my invention are illustrated by way of example. In the drawing:

Fig. 1 is a plan, and

Fig. 2, a side-elevation of the first embodiment,

Fig. 3, a detail of Fig. 2, and

Fig. 4, a plan of the second embodiment.

Like parts are indicated by like numerals of reference in the various figures of the drawing.

On the underside of a baseplate 1 of insulating material there is mounted the L-shaped permanent magnet 2. The shorter leg 21 of this magnet passes sideways beyond the baseplate and is bent upwards to extend beyond the upper face of the baseplate. On the baseplate is also mounted a support comprising a carrier or main supporting member 3 and an additional supporting member 31. The carrier or main supporting member 3 is provided with a lateral extension which carries the stationary contact screw 4. The smaller supporting member 31 is rigidly joined to the main supporting member 3 by a screw 5. Between the members 3 and 31, which are generally made of the same material, is clamped the root or carrying member 6 of the steel tongue 7, separating elements or washers of mica 8 and 81 being provided on either side. These elements 8, 81 form part of the support, so that the latter is composed of the parts 3, 31, 8, 81. Special care should be taken to ensure that the faces of the two supporting members 3 and 31 adjacent to the carrying member 6 of the vibratory tongue are perfectly alike. To the main supporting member 3 is connected one lead 12 of the circuit and the other lead 13 is connected to the root or carrying member 6 of the steel tongue 7. Both mica washers or elements 8 and 81 are of equal thickness. If the contact screw 4 is insulated from the main supporting member 3 it is not necessary to insulate the root or carrying member 6 of the tongue or armature 7, the parts 6, 7 together constituting a carrier for the oscillating or vibratory contact 18 arranged to co-operate with the stationary contact 4. The surfaces and the materials which contact with the cheeks of the root or carrying member 6 must, however, have equal heat conductivity and equal coefficients of expansion.

Fig. 3 shows the carrying member 6 as a relatively thick and comparatively sturdy perforated plate adapted to extend to the permanent magnet 2 and integral with the elastic vibratory tongue 7, which tapers toward its free end. At a place as close as possible to the tip of the tongue there is provided the contact 18. The tip of the tongue is adapted to oscillate in the air gap of a horseshoe iron core 10 composed of thin alloy stampings and carrying the windings 9. The yoke of the core abuts against the end 21 of the permanent magnet 2. The two pole-ends which enclose the air-gap in which the tip of the tongue is adapted to oscillate are as close together as possible. The whole may be enclosed in a dust tight and watertight box.

The tongue forms with the support 3, 31, 8, 81 to which it is bolted and with the counter-contact (screw 4) carried by the main supporting member 3 a very strong self-contained mechanical system. Due to the symmetrical exit of the permanent magnetic flux in the airgap the resulting force acting upon the tongue in the state of rest becomes practically zero. The unavoidable small residual force is harmless and its influence decreases as the size of the air gap increases. A comparatively large airgap may, however, be provided since apart from the gap itself a very low magnetic resistance is offered to the energizing flux.

The symmetrical guidance of the flux has in its turn the advantage that the permanent magnet need not be perfectly unchangeable and above all the advantage that owing to the one-sided action of forces on the oscillator no permanent deformation of the oscillator is possible even after long service, because the tongue has only to sustain the differential force developing during the energization. This arrangement of the magnets is also far better protected against external or stray fields than an unsymmetrical magnet system.

Of the second embodiment of my invention, illustrated in Fig. 4 of the drawing only the differences of construction as compared with the preceding figures are shown. The baseplate, the permanent magnet and the iron core with the winding have been omitted. The carrying or main supporting member 19 which carries the tongue 7 is integral therewith, the parts 19 and 7 together constituting a carrier for the vibratory contact 18. To said member 19 is bolted by screws 5 a metal beam or arm 22 which forms a carrier for the stationary counter-contact 4. Between the carrying or main supporting member 19 and the beam or carrier 22 is provided a washer or interposed separating element 81 of mica. To obtain the symmetry required by my invention the screw 5 does not press upon the carrier 22 directly, but through an additional supporting member 20 which is separated from the metal beam 22 by an interposed mica element or washer 8 which is similar to the washer 81. Since in Fig. 1 the washers 8, 81 and the root 6 of the tongue 7 are of different materials, they have different expansion rates and will be affected differently by temperature changes. But as the mica washers 8, 81 are on opposite sides of the metallic root 6, and engage it on surfaces of equal area, the effect of temperature changes will be compensated, any changes occurring at the contact surface on one side of the tongue being counteracted by equal, but opposite effects at the contact surface on the other side of the tongue. As a result of this, the position of the tongue 7, and particularly that of the contact 18 carried thereby, will not be affected by any temperature changes, and the normal gap between the contact 18 and the tip of the screw 4 will remain constant. Similarly, in Fig. 4, this gap will be maintained constant, notwithstanding any temperature variations, because the washers 8, 81, which are of a material different from that of the beam 22, engage the latter on opposite sides on surfaces of equal area, so as to obtain a balancing or compensating action which will keep the tip of the screw 4 in a constant position irrespective of the temperature changes.

The advantages of my invention will be understood best from the following additional considerations: Whenever, in a structure of the character described, two parts possessing different thermic properties are in engagement with each other, a change in temperature will cause one of the parts which are in such engagement, to expand more strongly than the other part. Since at said surface of engagement, or break of continuity, the said two parts are held together firmly and are therefore unable to expand independently, distortions or deformations will take place at such surfaces of engagement, or engagement zones of the two parts. For instance, if such surfaces or zones were originally plane, they will be distorted into a curved shape, substantially in the same manner that two flat circular metal discs of different temperature coefficients, welded together, will be distorted into spherical curvature by changes in temperature. The distortions or deformations which thus occur in mechanical rectifiers at breaks of continuity (surfaces where parts possessing different thermic properties engage each other) produce at other points of the apparatus changes of position which exceed many times the maximum linear expansion of the system. If for instance the parts 81 and 31 were omitted from Fig. 1 (the screw 5 being then in direct engagement with the part 6), the breaks of continuity existing at the surfaces where the element 8 engages the main supporting member 3 and the carrying member 6 respectively, would in the case of a change in temperature cause the part or carrying member 6 to be deformed in the manner just explained, and the tongue 7 carried thereby to be bent or warped from its original normal position. It is true the deformations at the surfaces of engagement would be very small, possibly even microscopic, but on account of the length of the tongue 7 they would result in a perceptible shifting of the vibratory contact 18 from its normal position and therefore in an appreciable alteration of the normal gap between the contacts 4 and 18; this, of course, would interfere with the accuracy of the measurements obtained.

In my invention, the disturbing effect of the deformations referred to above is avoided by a compensating effect which maintains a constant normal gap between the stationary contact 4 and the vibratory contact 18, irrespective of changes in temperature, said compensating effect being obtained by a special construction of those engagement surfaces on the carriers or supporting structure of said contacts at which temperature variations would tend to produce changes in the size of the normal gap between said contacts. According to my invention, each break of continuity resulting from the engagement of two parts of different thermic properties, which would tend to alter the size of said gap in the event of changes in temperature, is compensated, as regards said tendency or effect, by the provision, at the same point of the apparatus or at a different point, of another break of continuity symmetrical to the first, that is, a corresponding surface at which two parts possessing different thermic properties engage each other.

I claim as my invention:

1. In combination with a contact, a carrier for said contact, and a support for said carrier, said support having a plurality of contact areas on which materials of different thermic characteristics engage each other, said contact areas having mutually-compensating effects so as to maintain a constant normal position of said contact irrespective of temperature changes.

2. In combination with a contact, a carrier for said contact, and a support for said carrier, said support having two contact areas on which materials of different thermic characteristics engage each other with opposite effects, so as to compensate the effect of temperature variations and maintain a constant normal position of said contact.

3. In combination with a contact, a carrier for said contact, and a support for said carrier, said support including two elements engaging the said carrier on opposite sides on surfaces of equal size, said elements being made of the same material, which is different from that of the carrier, to compensate the effect of temperature variations and maintain a constant normal position of said contact irrespective of temperature changes.

4. In a mechanical rectifier, a carrier, an oscillating contact on said carrier, a stationary contact adapted to cooperate with said oscillating contact, a main supporting member and an additional supporting member both made of the same material, said carrier being clamped between said supporting members, to compensate the effect of temperature variations and maintain a constant normal gap between the said two contacts irrespective of temperature changes.

5. In a mechanical rectifier, a carrier, an oscillating contact on said carrier, a stationary contact adapted to cooperate with said oscillating contact, a main supporting members and an additional supporting member both made of the same material, said carrier being clamped between said supporting members, and the clamped surfaces on opposite sides of the said carrier being of equal size, to compensate the effect of temperature variations and maintain a constant normal gap between the said two contacts irrespective of temperature changes.

6. In a mechanical rectifier, a carrier, an oscillating contact on said carrier, a stationary contact adapted to cooperate with said oscillating contact, a main supporting member and an additional supporting member both made of the same material, the said carrier being clamped between said supporting members, and two elements interposed between the two clamped surfaces of said carrier and the adjacent supporting members, said elements being of equal size and made of the same material, which material is different from that of said supporting members, to compensate the effect of temperature variations and maintain a constant normal gap between the said two contacts irrespective of temperature changes.

7. In a mechanical rectifier with a carrier including a tongue capable of oscillating, a contact mounted on said oscillating tongue, a stationary contact adapted to cooperate with said oscillating contact, a main supporting member for said stationary contact, and an additional supporting member consisting of the same material as said main supporting member, said carrier being clamped between said supporting members on surfaces of equal size, to compensate the effect of temperature variations and maintain a constant normal gap between the said two contacts irrespective of temperature changes.

8. In a mechanical rectifier with a tongue capable of oscillating, and a stationary carrying member for said tongue, a stationary contact adapted to cooperate with said oscillating tongue, a carrier for said stationary contact, and an additional supporting member located on the side of the carrier opposite to that on which the said carrying member is arranged, the said carrier being clamped between said carrying member and said additional supporting member on surfaces of equal size, to compensate the effect of temperature variations and maintain a constant normal gap between the said contact and said oscillating tongue irrespective of temperature changes.

9. In a mechanical rectifier with a tongue capable of oscillating, and a stationary carrying member for said tongue, a stationary contact adapted to cooperate with said oscillating tongue, a carrier for said stationary contact, and an additional supporting member located on the side of the carrier opposite to that on which the said carrying member is arranged, the said carrier being clamped between said carrying member and said additional supporting member, and two elements interposed between the two clamped surfaces of said carrier, and the adjacent surfaces of said carrying member and said additional supporting member respectively, said elements being of equal size and made of the same material, which material is different from that of said carrying member and additional supporting member, to compensate the effect of temperature variations and maintain a constant normal gap between the said contact and said oscillating tongue irrespective of temperature changes.

10. In combination with a contact, a carrier for said contact, a support for said carrier, said support including a main supporting member and an additional supporting member between which said carrier is located, and two elements interposed between said carrier and said supporting members and engaging said carrier on opposite sides, said elements being of equal size and of the same material, which is different from the material of said carrier, to compensate the effect of temperature variations and maintain a constant normal position of said contact irrespective of temperature changes.

11. In combination with a contact, a carrier for said contact, a support for said carrier, said support including a main supporting member and an additional supporting member of like material between which said carrier is located, and two elements interposed between said carrier and said supporting members and engaging said carrier on opposite sides, said elements being of equal size and of the same material, which is different from the material of said carrier and of said supporting members, to compensate the effect of temperature variations and maintain a constant normal position of said contact irrespective of temperature changes.

12. In a mechanical rectifier, a vibratory contact, a carrier for said vibratory contact, a stationary contact adapted to co-operate with said vibratory contact, a carrier for said stationary contact, and an additional member made of the same material as one of said carriers, the other carrier being clamped between said member and the carrier made of the same material as said member, to compensate the effect of temperature variations and maintain a constant normal gap between the said two contacts irrespective of temperature changes.

13. In a mechanical rectifier, a vibratory contact, a carrier for said vibratory contact, a stationary contact adapted to co-operate with said vibratory contact, a carrier for said stationary contact, and an additional member made of the same material as one of said carriers, the other carrier being clamped between said member and the carrier made of the same material as said member, and the clamped surfaces on opposite sides of said clamped carrier being of equal size, to compensate the effect of temperature variations and maintain a constant normal gap between the said two contacts irrespective of temperature changes.

14. In a mechanical rectifier, a vibratory contact, a carrier for said vibratory contact, a stationary contact adapted to co-operate with said vibratory contact, a carrier for said stationary contact, an additional member made of the same material as one of said carriers, the other carrier being clamped between said member and the carrier made of the same material as said member, and two elements interposed between the two clamped surfaces of said clamped carrier and the adjacent surfaces of the other carrier and of said member respectively, said elements being of equal size and made of the same material, which material is different from that of said member and of said other carrier, to compensate the effect of temperature variations and maintain a constant normal gap between the said two contacts irrespective of temperature changes.

15. In a mechanical rectifier for measuring purposes, a vibratory contact, a stationary contact cooperating with said vibratory contact, a structure supporting said contacts and having a plurality of zones on which materials of different thermic characteristics engage each other in such a manner that the effect of temperature variations at any one of said zones, considering such zone by itself, would cause an alteration in the normal size of the gap between said contacts, all of said zones having, as regards the normal size of the gap between said contacts, mutually compensating effects so as to maintain a constant normal size of the gap between said contacts irrespective of temperature changes.

HANS PFANNENMÜLLER.